(12) United States Patent
Ramirez et al.

(10) Patent No.: US 12,517,734 B2
(45) Date of Patent: Jan. 6, 2026

(54) MIXED-SOURCED DEPENDENCY CONTROL FOR VECTOR INSTRUCTIONS

(71) Applicant: Akeana, Inc., Santa Clara, CA (US)

(72) Inventors: Ricardo Ramirez, Sunnyvale, CA (US); Abhijit Sil, Dublin, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 18/906,205

(22) Filed: Oct. 4, 2024

(65) Prior Publication Data

US 2025/0117226 A1   Apr. 10, 2025

Related U.S. Application Data

(60) Provisional application No. 63/702,192, filed on Oct. 2, 2024, provisional application No. 63/699,245, filed on Sep. 26, 2024, provisional application No. 63/691,351, filed on Sep. 6, 2024, provisional application No. 63/690,822, filed on Sep. 5, 2024, provisional application No. 63/687,795, filed on Aug. 28, 2024, provisional application No. 63/679,685, filed on Aug. 6, 2024, provisional application No. 63/679,192, filed on Aug. 5, 2024, provisional application No. 63/653,402, filed on May 30, 2024, provisional application No. 63/641,045, filed on May 1, 2024, provisional application No. 63/640,921, filed on May 1, 2024, provisional application No. 63/570,281, filed on Mar. 27, 2024, provisional application No. 63/564,529, filed on Mar. 13, 2024, provisional application No. 63/563,492, filed on Mar. 11, 2024, provisional application No. 63/563,102, filed on Mar. 8, 2024, provisional application No.

(Continued)

(51) Int. Cl.
*G06F 9/38* (2018.01)
*G06F 9/30* (2018.01)

(52) U.S. Cl.
CPC ........ *G06F 9/3838* (2013.01); *G06F 9/30036* (2013.01); *G06F 9/3013* (2013.01)

(58) Field of Classification Search
CPC .................................................... G06F 9/3838
See application file for complete search history.

(56) References Cited

U.S. PATENT DOCUMENTS 6,934,809 B2   8/2005   Tremblay et al.
7,506,105 B2   3/2009   Al-Sukhni et al.
(Continued)

FOREIGN PATENT DOCUMENTS

WO        2022117687 A1   6/2022

*Primary Examiner* — Michael J Metzger
(74) *Attorney, Agent, or Firm* — Adams Intellex, PLC

(57) ABSTRACT

Disclosed techniques enable processors that are capable of performing a wide range of vector operations. A processor can support multiple types of instructions. The instructions can include one or more operands, and the one or more operands can include different data types. An A-type instruction can have dependencies on a B-type instruction. An A-type instruction includes a vector instruction. A B-type instruction includes an integer instruction or a floating-point instruction. A datapath is provided to enable intermediate results from a B-type instruction to be supplied to the A-type instruction on which it depends, without utilizing register file resources, such as general-purpose register (GPR) register resources. Vector instruction performance is thereby enabled without the additional resources used with GPR register access.

24 Claims, 7 Drawing Sheets

Related U.S. Application Data

63/556,951, filed on Feb. 23, 2024, provisional application No. 63/556,944, filed on Feb. 23, 2024, provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023.

(56) References Cited

U.S. PATENT DOCUMENTS

| | | |
|---|---|---|
| 9,672,154 B1 | 6/2017 | Hsu et al. |
| 9,830,097 B2 | 11/2017 | Susarla et al. |
| 10,013,356 B2 | 7/2018 | Chou |
| 10,031,851 B2 | 7/2018 | Sundaram et al. |
| 10,671,394 B2 | 6/2020 | Britto et al. |
| 10,929,948 B2 | 2/2021 | Benthin et al. |
| 11,163,684 B1 | 11/2021 | Gray et al. |
| 11,288,405 B2 | 3/2022 | Belgarric et al. |
| 11,385,896 B2 | 7/2022 | Shulyak et al. |
| 11,403,099 B2 | 8/2022 | Cerny et al. |
| 11,403,225 B2 | 8/2022 | Zheng et al. |
| 11,429,529 B2 | 8/2022 | Hornung et al. |
| 11,442,863 B2 | 9/2022 | Shulyak et al. |
| 11,474,130 B2 | 10/2022 | Lentz et al. |
| 11,486,911 B2 | 11/2022 | Tuncer et al. |
| 2022/0004639 A1 | 1/2022 | Yardi et al. |
| 2022/0029780 A1 | 1/2022 | Dafali |
| 2022/0197657 A1 | 6/2022 | Soundararajan et al. |

MIXED-SOURCED DEPENDENCY CONTROL FOR VECTOR INSTRUCTIONS

RELATED APPLICATIONS

This application claims the benefit of U.S. provisional patent applications "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, "Cache Snoop Replay Management" Ser. No. 63/605,620, filed Dec. 4, 2023, "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, "Vector Operation Sequencing For Exception Handling" Ser. No. 63/570,281, filed Mar. 27, 2024, "Vector Length Determination For Fault-Only-First Loads With Out-Of-Order Micro-Operations" Ser. No. 63/640,921, filed May 1, 2024, "Circular Queue Management With Nondestructive Speculative Reads" Ser. No. 63/641,045, filed May 1, 2024, "Direct Data Transfer With Cache Line Owner Assignment" Ser. No. 63/653,402, filed May 30, 2024, "Weight-Stationary Matrix Multiply Accelerator With Tightly Coupled L2 Cache" Ser. No. 63/679,192, filed Aug. 5, 2024, "Non-Blocking Vector Instruction Dispatch With Micro-Operations" Ser. No. 63/679,685, filed Aug. 6, 2024, "Atomic Compare And Swap Using Micro-Operations" Ser. No. 63/687,795, filed Aug. 28, 2024, "Atomic Updating Of Page Table Entry Status Bits" Ser. No. 63/690,822, filed Sep. 5, 2024, "Adaptive SOC Routing With Distributed Quality-Of-Service Agents" Ser. No. 63/691,351, filed Sep. 6, 2024, "Communications Protocol Conversion Over A Mesh Interconnect" Ser. No. 63/699,245, filed Sep. 26, 2024, and "Non-Blocking Unit Stride Vector Instruction Dispatch With Micro-Operations" Ser. No. 63/702,192, filed Oct. 2, 2024.

Each of the foregoing applications is hereby incorporated by reference in its entirety.

FIELD OF ART

This application relates generally to computer processors and more particularly to mixed-source dependency control for vector instructions.

BACKGROUND

Processors are continually evolving to offer better performance. This includes improvements in clock speed (measured in GHz), the number of cores, cache size, and architectural enhancements. Multi-core processors, for example, allow for parallel processing of tasks, improving overall performance. Single-core or multi-core processors can manage processes and threads, allocate system resources, and handle interrupts, ensuring the smooth operation of the OS and all running software. The role of computer processors today extends far beyond basic instruction execution. They are pivotal in driving computing performance, security, and energy efficiency, and in enabling a wide range of applications across various domains. Continued advancements in processor technology are likely to shape the future of computing in even more profound ways.

Main categories of processors include Complex Instruction Set Computer (CISC) types and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Level Transfer (RTL) abstractions that define the synthesizable data to be fed into a logic synthesis tool which in turn creates the gate-level abstraction of the design that is used for downstream implementation operations.

Efficiency and performance are two of the most critical qualities of computer processors. These aspects are essential for a variety of reasons, spanning both consumer and enterprise computing. Efficient, high-performance processors can enable a smooth and responsive user experience. Faster processers ensure that applications load quickly, run smoothly, and respond promptly to user input. Furthermore, efficiency in processors is not just about speed, but also about power consumption. Energy-efficient processors are well suited for laptops, mobile devices, and data centers where power usage directly impacts battery life and/or operational costs. Processors that can deliver high performance while minimizing power consumption are highly desirable. Efficiency and performance in computer processors are vital for a wide range of applications and industries. They directly impact user experience, productivity, and energy consumption, and provide the ability to handle increasingly complex computing tasks. As technology continues to advance, processors that strike a balance between speed and efficiency will continue to have importance.

SUMMARY

Vector operations, which involve manipulating vectors (quantities with both magnitude and direction), are fundamental in various fields of science, engineering, and computer science. Vectors are used to represent forces, velocities, and accelerations. Vector operations are applied to solve problems involving motion, such as calculating the trajectory of projectiles or analyzing forces in structures. Vectors can be used for modeling and simulation of complex behaviors. In electromagnetism, vectors describe electric and magnetic fields. Vector operations are used to calculate the electric and magnetic forces, as well as to analyze the behavior of electromagnetic waves. In the field of fluid dynamics, vectors represent fluid velocities and pressure gradients. Vector calculus is used to analyze fluid flow, such as in aerodynamics, hydrodynamics, and heat transfer. In the fields of machine learning and artificial intelligence, vectors represent data features, and vector operations can be used to create new features and execute machine learning models. Furthermore, vector operations can be used for clustering similar data points and classifying data into different categories based on their similarity. Vectors can also be used to describe and manipulate graphical objects. Thus, there are many practical applications of vector operations across different fields, highlighting their versatility and importance in various scientific, engineering, and computational disciplines. Disclosed embodiments provide processing capability with efficient vector operations to promote the aforementioned applications, as well as other applications that utilize vector operations.

Techniques enabling processors that are capable of performing a wide range of vector operations, including manipulating vectors, are disclosed. The operations can include vector addition and subtraction, in which two or more vectors are added (or subtracted) component-wise to obtain a resultant vector. Vector addition/subtraction operations are used in physics, engineering, computer graphics, and other important disciplines. The operations can include scalar multiplication, in which a vector is multiplied by a scalar (a single numeric value). Scalar multiplication scales the magnitude of a vector without changing its direction. A scalar multiplication operation can be used to adjust the magnitude of physical quantities. The operations can include dot product operations, which include computing the dot product of two vectors, resulting in a scalar quantity. Applications of the dot product operation include physics and engineering to calculate work done, projections, angles between vectors, and so on. Disclosed embodiments can support these and other vector operations to provide support in a wide variety of applications, including, but not limited to, physics, engineering, computer graphics, machine learning, and more, allowing processors of disclosed embodiments to operate on multi-dimensional data and perform complex calculations involving vectors and vector quantities.

A processor-implemented method for instruction execution is disclosed comprising: accessing a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs); associating a DCAM within the one or more DCAMs with an entry of the A-type issue queue, wherein the associating includes a unique temporary register; detecting a dependency within an A-type instruction, wherein the dependency is based on an output of a B-type instruction, and wherein the detecting identifies a physical output register ID associated with the B-type instruction; dispatching the A-type instruction and the B-type instruction, wherein the A-type instruction is sent to the A-type issue queue and the B-type instruction is sent to the B-type issue queue, wherein the dispatching includes the physical output register ID; executing, by the processor core, the B-type instruction; snooping a completion bus associated with the B-type issue queue, wherein the snooping is based on the physical output register ID; searching, for a match in the DCAM, wherein the searching is based on the physical output register ID that was snooped, wherein the searching causes a hit in the DCAM, and wherein the DCAM returns the unique temporary register that was associated with the DCAM; storing, in the unique temporary register that was returned, the output of the B-type instruction, from the completion bus, wherein the storing clears a dependency flag in the A-type issue queue, wherein the clearing indicates that the dependency has been satisfied; and executing the A-type instruction, wherein the dependency is satisfied with data within the unique temporary register that was returned. Some embodiments comprise identifying, within the A-type instruction, a second dependency. In embodiments, the second dependency is based on an output of a second A-type instruction. In embodiments, the dispatching and the executing include the second A-type instruction. Some embodiments comprise saving the output of the second A-type instruction in a register within a register file. In embodiments, the A-type instruction comprises a vector instruction.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
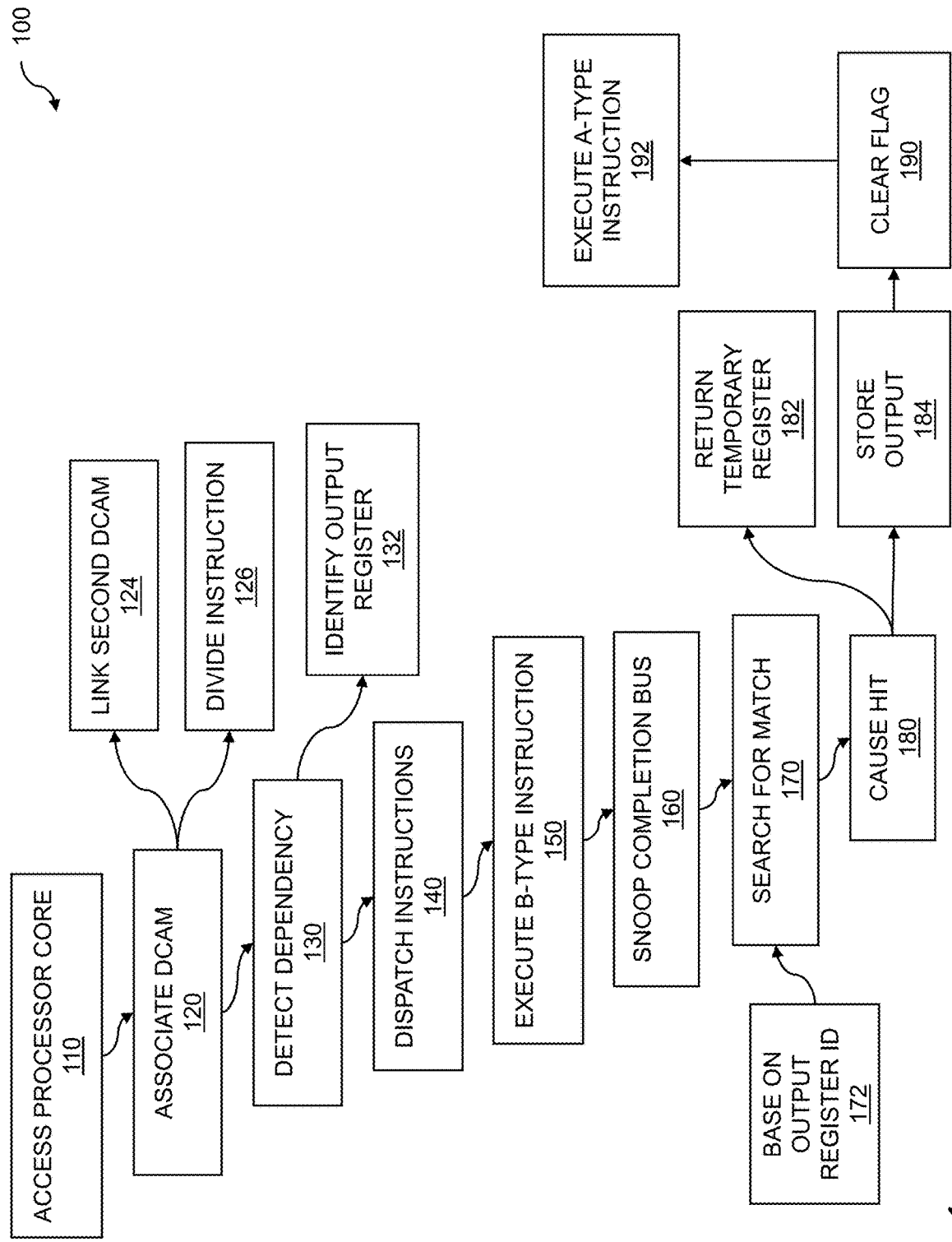
FIG. 1 is a flow diagram for mixed-source dependency control for vector instructions.

Processors are ubiquitous, and are now found in everything from appliances to satellites. The processors enable the devices within which the processors are located to execute a wide variety of applications. The applications include telephony, messaging, data processing, patient monitoring, vehicle access and operation control, etc. The processors are coupled to additional elements that enable the processors to execute their assigned applications. The additional elements typically include one or more of shared, common memories, communication channels, peripherals, and so on. Modern integrated circuits can have many millions of logic gates, with each gate implemented by one or more transistors. Adding extra gates to an integrated circuit (IC) can have several disadvantages, despite the potential benefits they may bring. Each gate in an IC consumes power when it switches between logic states (0 and 1). Adding extra gates increases the overall power consumption of the integrated circuit, which can be a significant concern in battery-powered devices or when trying to minimize heat generation in high-performance systems. Furthermore, extra gates require physical space on the IC. This can lead to larger chip sizes and more complex layouts, making manufacturing more challenging and increasing costs. The extra gates can also limit the ability to integrate other components on the same chip. Moreover, additional gates switching simultaneously consumes additional power and generates more heat. Excessive heat can degrade the performance and reliability of the IC and may require additional cooling solutions, adding to the overall system complexity and cost. Thus, while adding extra gates to an integrated circuit can provide additional functionality and features, it comes with trade-offs such as increased power consumption, slower signal propagation, larger size, and increased complexity.

Disclosed embodiments provide techniques for mixed-source dependency control for vector instructions that utilize a reduced amount of hardware elements, thereby providing mitigation for the aforementioned problems. In embodiments, a dispatch unit within a processor dispatches instructions of a first type that include prerequisite data of a second type. An instruction issue queue for the second type provides intermediate results to an instruction issue queue for the first type via one or more content addressable memories attached to temporary registers, eliminating the need to expand register read ports for supporting the operations. Disclosed embodiments are well suited for vector operations that have prerequisite integer data or floating-point data, enabling efficient vector operations while reducing the number of gates and logic needed for supporting the vector operations.

Techniques for mixed-source dependency control are disclosed. A processor can support multiple types of instructions. The instructions can include one or more operands, where the one or more operands can include different data types. As an example, a vector instruction can include operands that include integer data and/or floating-point data. Thus, when a vector instruction includes an integer operand, the vector instruction can have a dependency on an integer instruction. More generally, an A-type instruction can have dependencies on a B-type instruction. In embodiments, an A-type instruction can include a vector instruction, and a B-type instruction can include an integer instruction or a floating-point instruction. Disclosed embodiments provide a datapath to enable intermediate results from a B-type instruction to be supplied to the A-type instruction on which it depends without utilizing register file resources, such as general-purpose register (GPR) register resources. This enables vector instruction performance without the additional resources used with GPR register access, improving overall efficiency of processor execution.

Disclosed embodiments utilize content-addressable memory (CAM). A CAM is a specialized type of computer memory that allows for quick data retrieval based on the content of the data rather than its memory address. The CAM enables content-based searches that can return a memory address or data associated with the matching content. A CAM can perform searches in parallel, meaning it can compare the input data against all stored data simultaneously. This makes a CAM extremely fast for specific types of search operations. Thus, a CAM is often referred to as "associative memory" because it associates data with its content. Disclosed embodiments implement a dependency CAM (DCAM) that is used for storing and retrieving intermediate results for completion of an instruction, such as a vector instruction. By utilizing the DCAM arrangement of disclosed embodiments, additional cost and complexity of providing additional register file ports is eliminated, while still providing efficient vector instruction execution capabilities.

FIG. 1 is a flow diagram for mixed-source dependency control for vector instructions. The flow 100 includes accessing a processor core 110, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs). The processor core can include a RISC-V core, ARM core, MIPS core, or other suitable core type. The processor core can include a variety of components, including, but not limited to, vector processing units, floating-point instruction units, arithmetic logic units (ALUs), and so on. In embodiments, the processor core executes one or more instructions out of order. In other embodiments, the core executes instructions in order. The processor core can be included on a multi-processor chip, system-on-a chip (SOC), and so on. In embodiments, the processor core can execute an A-type instruction, wherein the A-type instruction comprises a vector instruction. To process the A-type instruction, the processor can include an A-type issue queue, wherein the A-type issue queue comprises a vector issue queue. In other embodiments, the processor core executes a B-type instruction, wherein the B-type instruction comprises an integer instruction. To process the B-type instruction, the processor can include a B-type issue queue, wherein the B-type issue queue comprises an integer issue queue. In further embodiments, the B-type instruction comprises a floating-point instruction and the B-type issue queue comprises a floating-point issue queue. One or more DCAMs can be implemented with a 6T SRAM cell, a NOR cell, a NAND cell, and so on.

The flow 100 includes associating a DCAM 120 within the one or more DCAMs with an entry of the A-type issue queue, wherein the associating includes a unique temporary register. The associating can be accomplished by storing, in the DCAM, an identifier for the temporary register. Each entry of the A-type issue queue can be coupled to a DCAM which can be associated with a unique temporary register. Thus, in embodiments, the associating can comprise linking a second DCAM 124 within the one or more DCAMs with a second entry of the A-type issue queue, wherein the associating includes a second unique temporary register. In practice, there can be more than two DCAMs associated with an instruction queue. In embodiments, there can be 4, 8, 16, 32, or more DCAMs associated with an instruction queue. In other embodiments, the DCAM is included within a vector execution unit.

The flow 100 can include dividing an architectural instruction 126 into the A-type instruction and the B-type instruction. An architectural instruction can be based on an instruction set architecture (ISA). The ISA can be based on a processor type, such as ARM, MIPS, RISC-V, and so on. In embodiments, the A-type instruction and the B-type instruction are created from a single instruction within the ISA. As an example, in the case of a RISC-V architecture, instructions can include vadd.vx, which adds a scalar to each element of a vector, vmul.vx, which multiplies each element of a vector by a scalar, vsub.vx, which subtracts a scalar from each element of a vector, vdiv.vx, which divides each element of a vector by a scalar, and so on. In each of these examples, two instructions, an A-type instruction and a B-type instruction, can be created from the dispatched instruction with an inherent dependency that must be handled during execution.

The flow 100 includes detecting a dependency 130 within an A-type instruction, wherein the dependency is based on an output of a B-type instruction, and wherein the detecting identifies a physical output register ID 132 associated with the B-type instruction. Dependencies can occur due to the interrelated nature of instructions and the need to maintain program correctness. The dependencies can include, but are not limited to, data dependencies, resource dependencies, output dependencies, and/or control dependencies. Disclosed embodiments can identify and accommodate these dependencies via one or more dependency flags within an instruction issue queue, to ensure proper instruction execution. Additional instruction execution techniques, including, but not limited to, instruction reordering, out-of-order execution, and/or speculative execution, may also be used in some embodiments to help improve instruction-level parallelism and overall processor efficiency while ensuring the correct execution of programs. The flow 100 can include identifying a physical output register ID 132. The physical output register ID 132 can identify a physical register associated with a B-type instruction, enabling storage and retrieval of intermediate results, such as integer or floating-point results, that may be used to complete a mixed dependency vector instruction. The physical output register ID 132 can refer to a general-purpose register (GPR), a floating-point register (FPR), a temporary register, and so on. In this case, the dependency can be explicit. As previously described, the A-type instruction and the B-type instruction can be created from a single architectural instruction that was dispatched. Thus, the dependency can be implicit since the original instruction did not identify a register to use from transferring the B-type instruction's result to the A-type instruction. In this case, the physical output register ID associated with the B-type instruction is a register that is read by the B-type instruction.

The flow 100 continues with dispatching 140 the A-type instruction and the B-type instruction, wherein the A-type instruction is sent to the A-type issue queue and the B-type instruction is sent to the B-type issue queue, wherein the dispatching includes the physical output register ID. The A-type instruction can include a vector instruction. In embodiments, the B-type instruction comprises an integer instruction. In further embodiments, the B-type issue queue comprises an integer issue queue. In other embodiments, the B-type instruction comprises a floating-point instruction. In further embodiments, the B-type issue queue comprises a floating-point issue queue. In embodiments, the A-type instruction includes a first instruction type. In embodiments, the B-type instruction includes a second instruction type. The dispatch unit can send the physical output register ID associated with an instruction to its corresponding issue queue. In embodiments, the physical output register ID is stored in the entry of the issue queue that contains the dispatched instruction. After execution, the issue queue can broadcast the physical output register ID as well as the execution result of the instruction on its results bus.

The flow 100 continues with executing, by the processor core, the B-type instruction 150. Once any dependencies are met, the B-type issue queue can send the B-type instruction into an execution engine for execution. The execution engine can comprise an adder, shifter, multiplier, and so on. The execution engine can be pipelined. In embodiments, one or more execution engines comprise an execution pipeline. Once execution is completed by the execution engine, results of the instruction can be broadcast to a completion bus. In embodiments, the physical output register ID associated with the instruction is also broadcast on the completion bus. In embodiments, the B-type instruction comprises an integer instruction. In other embodiments the B-type instruction comprises a floating-point instruction.

The flow 100 continues with snooping a completion bus 160 associated with the B-type issue queue, wherein the snooping is based on the physical output register ID. In embodiments, the completion bus can have a width of 32 bits, 64 bits, 128 bits, or another suitable width. In embodiments, the snooping is performed by one or more DCAMs that are associated with the issue queue. In embodiments, each DCAM is also associated with a temporary register. In embodiments, a temporary register stores integer data. In other embodiments, a temporary register stores floating point data. Storage of other data types is possible.

The flow 100 continues with searching for a match 170 in the DCAM, wherein the searching is based on the physical output register ID 172 that was snooped, wherein the searching causes a hit 180 in the DCAM, and wherein the DCAM returns the unique temporary register 182 that was associated with the DCAM. The DCAM can provide an associative lookup to allow access to temporary registers that can be used for storage and retrieval of intermediate results of the B-type instruction that are needed for completion of a corresponding A-type instruction. One or more DCAMs can be searched for an entry with a matching address to the physical output register ID that was broadcast on the completion bus. A hit 180 is caused when a match is found in a DCAM. When a hit is detected in a DCAM, the temporary register held within that DCAM can be read. The temporary register can be returned 182 to the A-type issue queue. The temporary register can represent a register, memory location, and/or scratchpad memory location for storing an output. In embodiments, the temporary register is accessible via the issue queue.

The flow 100 continues with storing 184, in the unique temporary register that was returned, the output of the B-type instruction, from the completion bus, wherein the storing clears a dependency flag 190, in the A-type issue queue, wherein the clearing indicates that the dependency has satisfied an output. The storing can be accomplished by the A-type issue queue. The output that is stored can include the result of a B-type instruction that was broadcast on the completion bus associated with the B-type instruction. In embodiments, the result of the B-type instruction is stored in the temporary register that was identified as a result of the hit in the DCAM. In embodiments, the A-type issue queue updates the entry of the A-type instruction with the temporary register which can contain the result of the depending B-type instruction. Once the data from the depending B-type instruction is stored in the temporary register and the A-type issue queue entry associated with the A-type instruction is updated, the A-type issue queue can clear a dependency flag 190, indicating that the A-type instruction is no longer waiting on the B-type result to execute. In embodiments, one or more dependency flags can be included in each entry of an A-type instruction issue queue. In embodiments, as long as at least one dependency flag is set, the A-type instruction is in a stalled/sleeping/waiting state.

The flow 100 continues with executing the A-type instruction 192, wherein the dependency is satisfied with data within the unique temporary register that was returned. In one or more embodiments, once all dependency flags are cleared, the A-type instruction may be executed to completion. In embodiments, the A-type instruction is issued to an execution engine in the execution pipeline. Execution of the A-type instruction can be accomplished by the execution engine. The execution engine can comprise an adder, shifter, multiplier, and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
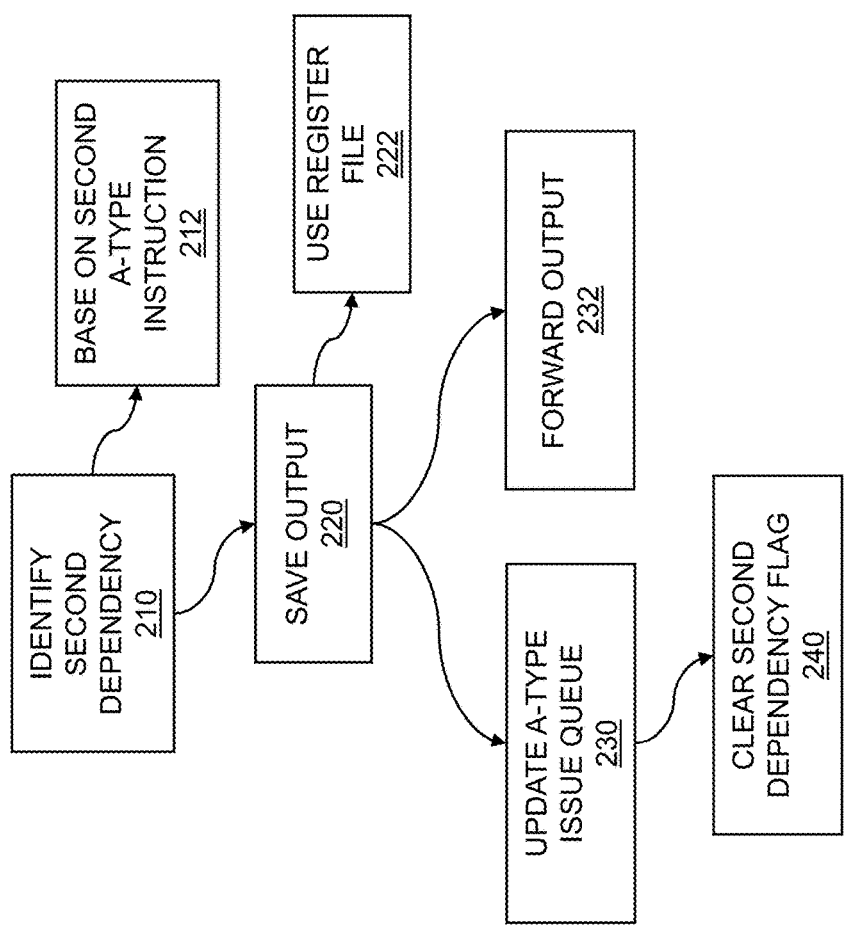
FIG. 2 is a flow diagram for handling a second dependency.

FIG. 2 is a flow diagram for handling a second dependency. The flow 200 starts with identifying, within the A-type instruction, a second dependency 210. In a usage example, an A-type instruction, which can be a vector instruction, can have a dependency on both vector data and integer data. As described above and throughout, the integer data can be a result of a B-type instruction, which can be an integer instruction. The B-type instruction can form a dependency for the A-type instruction which can be handled by disclosed embodiments. The vector data can also comprise a dependency for the A-type instruction. Thus, in embodiments, the second dependency is based on an output of a second A-type instruction 212. Recall that an A-type instruction can be stalled in an A-type issue queue while it waits for outstanding dependencies to be satisfied. The depending instructions can be dispatched, and executed to satisfy these dependencies. In embodiments, the dispatching and the executing include the second A-type instruction.

The flow 200 continues with saving the output 220 of the second A-type instruction in a register within a register file 222. The second A-type instruction, which can be a vector instruction, can be executed by an execution engine within the vector unit. During execution, the result of the second A-type instruction can be stored in the register file. This can include writing the result of the second A-type instruction to a register within a vector register file (VRF). Downstream instructions which depend on the result of the second A-type instruction can read those results from the VRF. Since in this example the A-type instruction depends on the second A-type instruction, the flow 200 can include updating the entry of the A-type issue queue 230, corresponding to the A-type instruction, with the register.

Once the entry of the A-type issue queue is updated with the location of results of the second A-type instruction, the flow 200 can include clearing a second dependency flag 240, in the entry of the A-type issue queue, wherein the second dependency flag indicates that the second dependency has been satisfied. Execution can then proceed by issuing, by the issue queue, the A-type instruction to an execution engine in an execution pipeline.

As described above, one way of fulfilling a dependency in the A-type instruction is by using a register in a register file such as a VRF and updating the issue queue entry of the A-type instruction with the register that holds the needed data. As an alternative to using a register file to process the second A-type dependency, the flow 200 can include forwarding 232, by bypass logic, the output of the second A-type instruction to the entry of the A-type issue queue. Bypass logic can forward, from within the execution pipeline, needed results to a dependent instruction when the data is first available. This can be a faster method for the A-type instruction to receive the necessary data than using the register file which requires additional processor cycles to read and write the register file before the data can be used by the A-type instruction.

In one or more embodiments, the first dependency flag can correspond to an integer instruction and the second dependency flag can correspond to a vector instruction. In one or more embodiments, the first dependency flag can correspond to a floating-point instruction and the second dependency flag can correspond to a vector instruction. Embodiments can include identifying, within the A-type instruction, a second dependency. In embodiments, the second dependency is based on an output of a second A-type instruction. In embodiments, the dispatching and the executing includes the second A-type instruction. Embodiments can include saving the output of the second A-type instruction in a register within a register file. Embodiments can include updating the entry of the A-type issue queue, corresponding to the A-type instruction, with the register. Embodiments can include clearing a second dependency flag, in the entry of the A-type issue queue, wherein the second dependency flag indicates that the second dependency has been satisfied.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
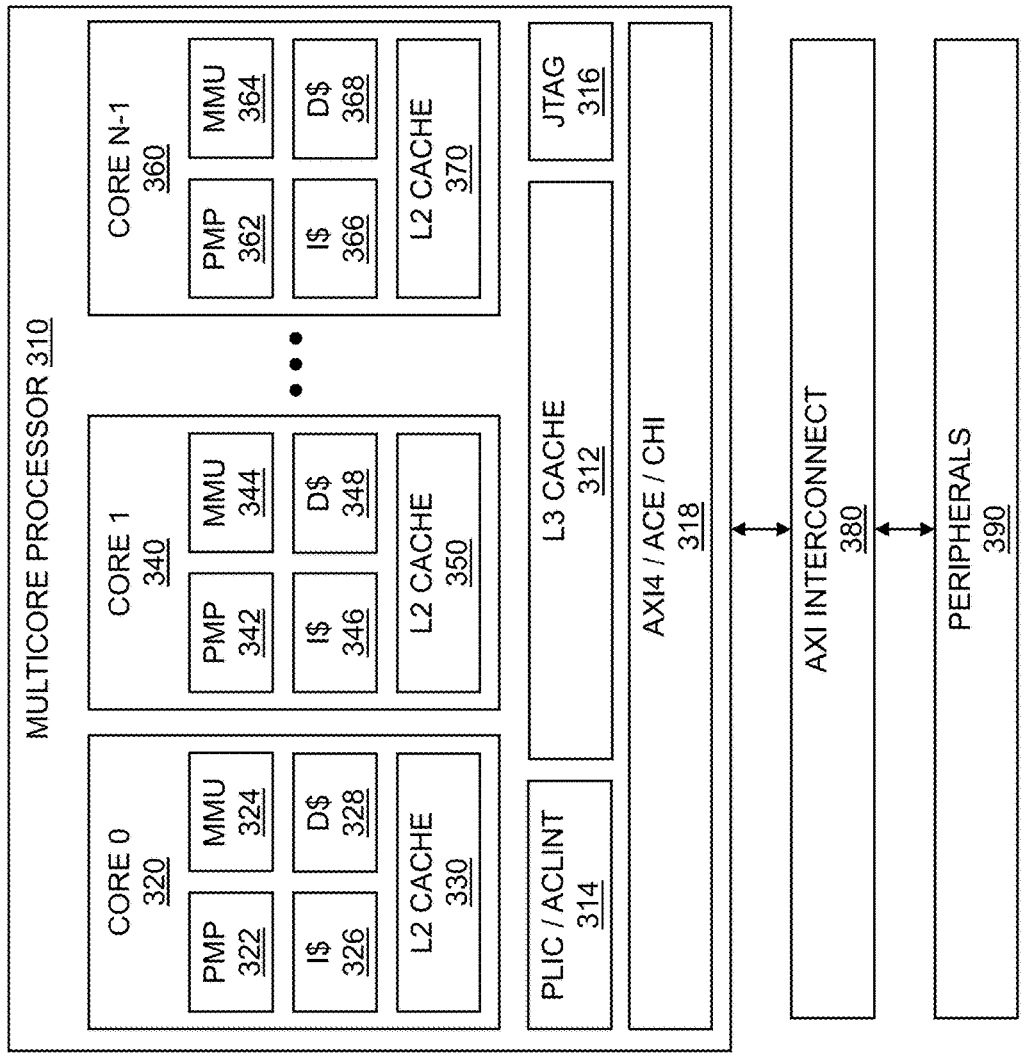
FIG. 3 is a block diagram illustrating a multicore processor.

FIG. 3 is a block diagram illustrating a multicore processor. The processor, such as a RISC-V™ processor, ARM processor, or other suitable processor type, can include a variety of elements. The elements can include processor cores, one or more caches, memory protection and management units, local storage, and so on. In embodiments, the processor core executes one or more instructions out of order. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by coherency management using distributed snoop. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

In the block diagram 300, the multicore processor 310 can comprise two or more processors, where the two or more processors can include homogeneous processors, heterogeneous processors, etc. In the block diagram 300, the multicore processor can include N processor cores such as core 0 320, core 1 340, core N−1 360, and so on. Each processor can comprise one or more elements. In embodiments, each core, including cores 0 through core N−1 can include a physical memory protection (PMP) element, such as PMP 322 for core 0; PMP 342 for core 1, and PMP 362 for core N−1. In a processor architecture such as the RISC-V™ architecture, a PMP can enable processor firmware to specify one or more regions of physical memory such as cache memory of the shared memory, and to control permissions to access the regions of physical memory. The cores can include a memory management unit (MMU) such as MMU 324 for core 0, MMU 344 for core 1, and MMU 364 for core N−1. The memory management units can translate virtual addresses used by software running on the cores to physical memory addresses with caches, the shared memory system, etc.

The processor cores associated with the multicore processor 310 can include caches such as instruction caches and data caches. The caches, which can comprise level 1 (L1) caches, can include an amount of storage such as 16 KB, 32 KB, and so on. The caches can include an instruction cache I$ 326 and a data cache D$ 328 associated with core 0; an instruction cache I$ 346 and a data cache D$ 348 associated with core 1; and an instruction cache I$ 366 and a data cache D$ 368 associated with core N−1. In addition to the level 1 instruction and data caches, each core can include a level 2 (L2) cache. The level 2 caches can include L2 cache 330 associated with core 0; L2 cache 350 associated with core 1; and L2 cache 370 associated with core N−1. The cores associated with the multicore processor 310 can include further components or elements. The further elements can include a level 3 (L3) cache 312. The level 3 cache, which can be larger than the level 1 instruction and data caches and the level 2 caches associated with each core, can be shared among all of the cores. The further elements can be shared among the cores. In embodiments, the further elements can include a platform level interrupt controller (PLIC) 314. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 316. The JTAG can provide a boundary within the cores of the multicore processor. The JTAG can enable fault information to a high precision. The high-precision fault information can be critical to rapid fault detection and repair.

The multicore processor 310 can include one or more interface elements 318. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 300, the interface elements can be coupled to the interconnect. The interconnect can include a bus, a network, and so on. The interconnect can include an AXI™ interconnect 380. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between the multicore processor 310 and one or more peripherals 390. The one or more peripherals can include storage devices, networking devices, and so on. The peripherals can enable communication using the AXI™ interconnect by supporting standards such as AMBA™ version 4, among other standards.

Figure 4:
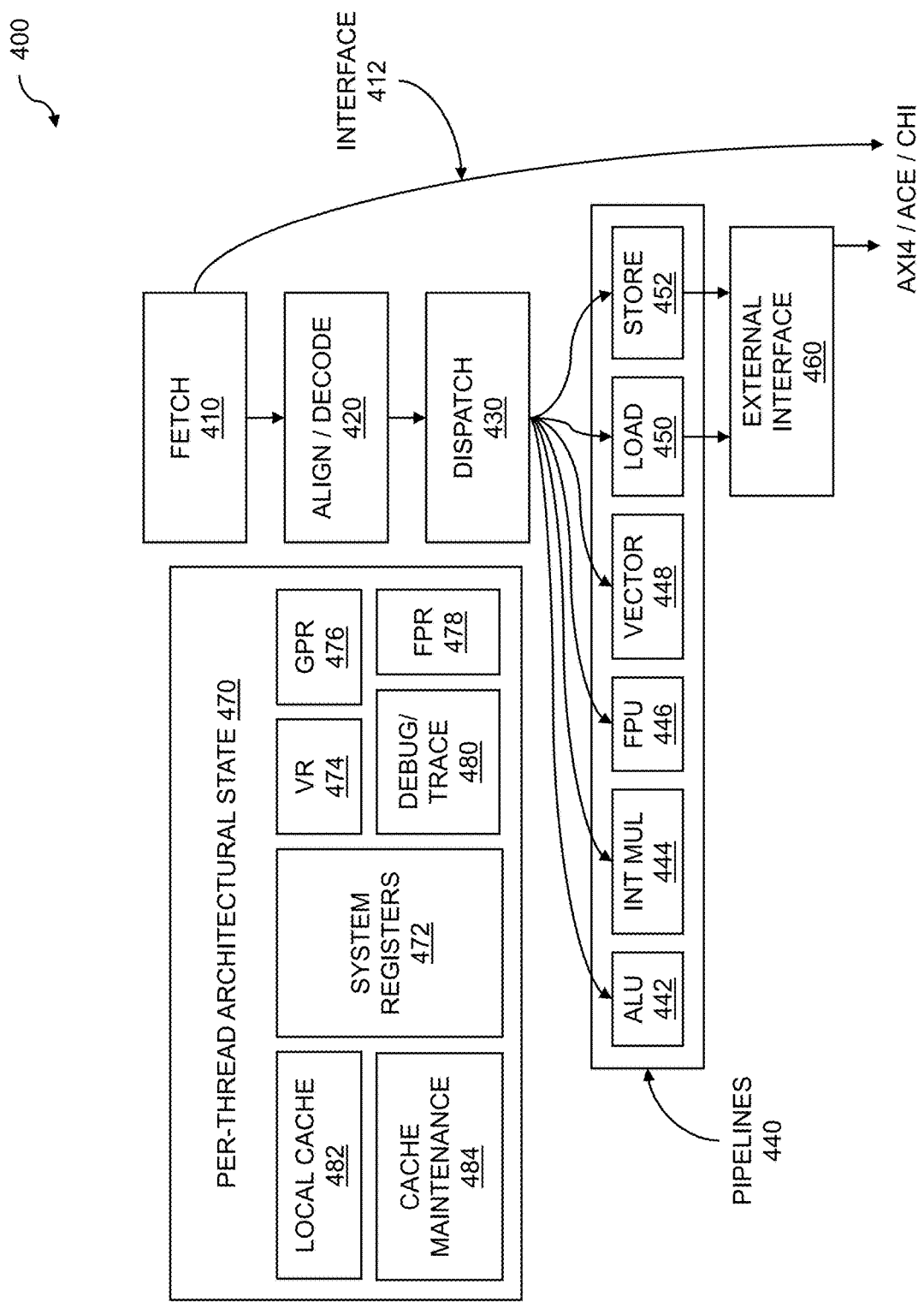
FIG. 4 is a block diagram for a pipeline.

FIG. 4 is a block diagram for a pipeline. The use of one or more pipelines associated with a processor architecture can greatly enhance processing throughput. The processor architecture can be associated with one or more processor cores. The processing throughput can be increased because multiple operations can be executed in parallel. A plurality of processor cores is accessed, wherein the plurality of processor cores comprises a coherency domain, and wherein two or more processor cores within the plurality of processor cores generate read operations for a shared memory structure coupled to the plurality of processor cores.

The blocks within the block diagram 400 can be configurable in order to provide varying processing levels. The varying processing levels can be based on processing speed, bit lengths, and so on. The block diagram 400 can include a fetch block 410. The fetch block 410 can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 412. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 400 includes an align and decode block 420. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The block diagram 400 can include a dispatch block 430. The dispatch block can receive decoded instruction packets from the align and decode block. The decoded instruction packets can be used to control a pipeline 440, where the pipeline can include an in-order pipeline, an out-of-order (OoO) pipeline, etc. A pipeline can be associated with the one or more execution units. The pipelines associated with the execution units can include processor cores, arithmetic logic unit (ALU) pipelines 442, integer multiplier pipelines 444, floating-point unit (FPU) pipelines 446, vector unit (VU) pipelines 448, and so on. The dispatch unit can further dispatch instructions to pipes that can include load pipelines 450, and store pipelines 452. The load pipelines and the store pipelines can access storage such as the common memory using an external interface 460. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 470. The inclusion of the per-thread architectural state can be based on a configuration or architecture that can support multi-threading. In embodiments, thread selection logic can be included in the fetch and dispatch blocks discussed above. Further, when an architecture supports and out-of-order (OoO) pipeline, then a retire component (not shown) can also include thread selection logic. The per-thread architectural state can include system registers 472. The system registers can be associated with individual processors, a system comprising multiple processors, and so on. The system registers can include exception and interrupt components, counters, etc. The per-thread architectural state can include further registers such as vector registers (VR) 474. The vector registers can be grouped in a vector register file and can be used for vector operations. In embodiments, the width of the vector register file is 512 bits. Additional registers such as general-purpose registers (GPR) 476 and floating-point registers (FPR) 478 can be included. These registers can be used for general purpose (e.g., integer) operations, and floating-point operations, respectively. The per-thread architectural state can include a debug and trace block 480. The debug and trace block can enable debug and trace operations to support code development, troubleshooting, and so on. In embodiments, an external debugger can communicate with a processor through a debugging interface such as a joint test action group (JTAG) interface. The per-thread architectural state can include a local cache state 482. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 484. The cache maintenance state can include maintenance needed, maintenance pending, and maintenance complete states, etc.

Figure 5:
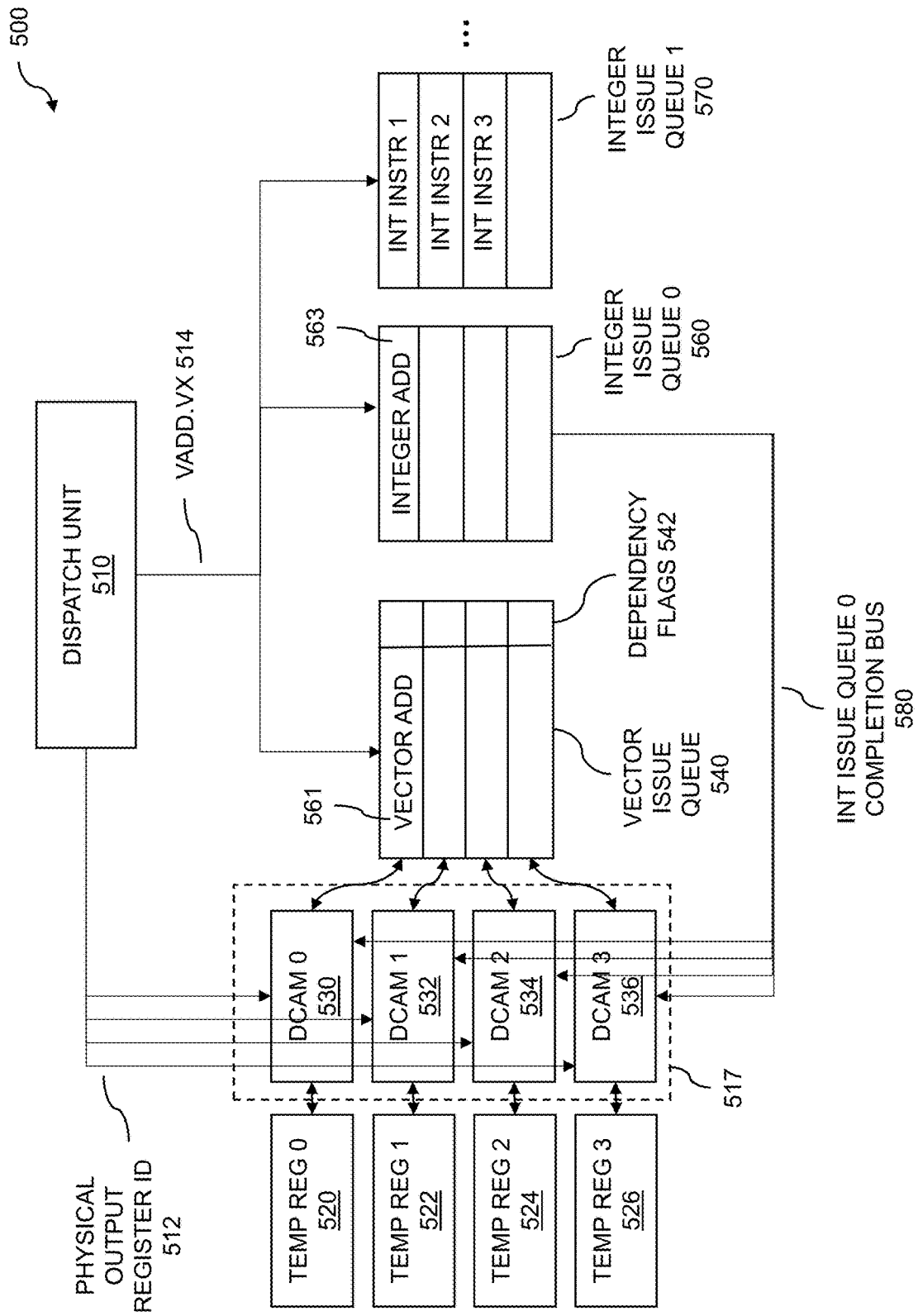
FIG. 5 is a system block diagram for dependency control.

FIG. 5 is a system block diagram for dependency control. The system block diagram 500 includes dispatch unit 510. The dispatch unit 510 can be part of an instruction pipeline in accordance with disclosed embodiments. The dispatch unit 510 can dispatch instructions that have dependencies. The dependencies can arise when operands of an A-type instruction require instructions of a B-type for evaluation of the operands. In embodiments, the A-type instruction is a vector instruction, and the B-type instruction is an integer instruction. The dispatch unit 510 is coupled to the DCAM module 517, which includes a plurality of DCAMs, indicated as 530, 532, 534, and 536. Each DCAM is coupled to a corresponding temporary register for storing and retrieving intermediate results. DCAM 0 530 is coupled to temporary register 0 520, DCAM 1 532 is coupled to temporary register 1 522, DCAM 2 534 is coupled to temporary register 2 524, and DCAM 3 536 is coupled to temporary register 3 526. An A-type issue queue, which can be a vector issue queue 540, can include a plurality of entries. Each entry in the vector issue queue 540 corresponds to a DCAM within the DCAM module 517, and the corresponding DCAM is associated with a corresponding temporary register. Thus, in embodiments, for each entry in the vector issue queue 540, there exists a corresponding DCAM and temporary register.

As previously described, an A-type instruction and a B-type instruction can be created from a single instruction within an instruction set architecture. In the figure, a vadd.vx instruction 514 is replaced by a vector instruction 561 dispatched to vector issue queue 540 and integer instruction 563 is dispatched to a B-type issue queue, which can be an integer issue queue 0 560. One or more additional issue queues can be included in the processor core, such as integer issue queue 1 570. The vector instruction 561 can depend on the result of integer instruction 563. Each entry in the vector issue queue 540 includes a corresponding dependency flags field 542. The dependency flags field 542 can include one or more ID bits signifying dependencies. In embodiments, the bits can correspond to one or more integer instructions, vector instructions, and/or floating-point instructions that need to be executed prior to the instruction(s) within the vector issue queue 540.

The dispatch unit 510 can provide a physical output register ID 512 to track dependencies and direct the storage and access of temporary data. Since the A-type instruction and the B-type instruction were created from a single architectural instruction that was dispatched, the dependency in this case is implicit. This is because the original instruction did not identify a register to use for transferring the B-type instruction's result to the A-type instruction. In embodiments, the physical output register ID 512 associated with the B-type instruction is a register that is read by the B-type instruction. The physical output register ID 512 can be sent to the DCAM module 517 such that the DCAM associated with the vector issue queue that contains vector instruction 561 can be loaded with the physical output register ID. The physical register ID 512 can be used by the dependency flags associated with vector instruction 561 to track the dependency with integer instruction 563. The physical register ID 512 can also be included in the integer issue queue 0 560 as explained below.

Instruction 561 is in the first slot of the vector issue queue 540, and depending integer instruction 563 is in the first slot of integer issue queue 0 560. In practice, the depending integer instruction can be dispatched into any available slot within integer issue queue 0 560. The integer issue queue 0 560 is also coupled to the DCAMs via an integer issue queue 0 completion bus 580. The instruction pipeline first executes integer instruction 563 while vector instruction 561 is in a waiting or stalled state. When execution of the integer instruction is complete, results are provided on the integer issue queue 0 completion bus 580 along with the associated physical output register ID. DCAMs 530, 532, 534, and 536 can then snoop the completion bus 580 to look for a hit on the physical output register ID that was broadcast on the bus. When a hit occurs in a DCAM, results from the integer instruction are stored to the indicated temporary register.

Once instruction 563 completes and results are written into a temporary register, dependency flags of vector instruction 561 can be cleared, indicating that the depending data is ready and the vector instruction 561 can begin execution. Results stored in the temporary register can be accessed based on the issue queue of the vector instruction. That is, since each entry of the vector issue queue was previously associated with a unique DCAM, execution of the vector instruction can include looking up, in the corresponding DCAM, the address of the temporary register where results from instruction 561 can be retrieved. Execution of vector instruction 561 can then continue in the vector execution engine.

Using the embodiments disclosed, a vector instruction can obtain prerequisite data from dependent instructions, such as an integer instruction, without the need for an additional read port on a general-purpose register file, thereby improving efficiency of vector instruction execution. Although not shown in FIG. 5 for the sake of clarity, additional integer issue queues can also include a corresponding integer issue queue completion bus and DCAM and temporary register for each entry in the additional queues. Note that while four DCAMs are shown in DCAM module 517, disclosed embodiments can have more or fewer DCAMs. In some embodiments, the number of DCAMs includes 16, 32, 64, or 128 DCAMs. In embodiments, the vector instruction depends on a floating-point instruction. Similar embodiments include a floating-point issue queue to handle floating point dependency and allow a vector instruction to execute without the need of an additional read port on a floating-point register file.

Embodiments can include forwarding, by bypass logic, the output of the second A-type instruction to the entry of the A-type issue queue. In embodiments, the A-type instruction comprises a vector instruction. In embodiments, the A-type issue queue comprises a vector issue queue. In embodiments, the DCAM is included within a vector execution unit. In embodiments, the associating comprises linking a second DCAM within the one or more DCAMs with a second entry of the A-type issue queue, wherein the associating includes a second unique temporary register. In embodiments, a number of DCAMs is equivalent to the number of entries in the A-type issue queue. In embodiments, the B-type instruction comprises an integer instruction. In embodiments, the B-type issue queue comprises an integer issue queue.

In embodiments, the B-type instruction comprises a floating-point instruction. In embodiments, the B-type issue queue comprises a floating-point issue queue. Floating-point numbers are used in computers to represent and perform arithmetic operations on real numbers with a wide range of values and precision. They are essential for a variety of applications across multiple domains. For example, in fields such as physics, chemistry, and engineering, simulations often involve complex mathematical models which require high precision. Floating-point numbers can enable accurate representation of physical phenomena. In the field of image processing, filtering, and transformations often require floating-point precision to maintain image quality. Moreover, data analysis tools use floating-point numbers for statistical calculations, regression analysis, and hypothesis testing. In the field of "Big Data", floating-point numbers can be used in the processing and analyzing of large datasets. Disclosed embodiments enable efficient use of floating-point data in vector operations.

Alternative implementations are possible. For example, a temporary register can be associated with an entry in an A-type issue queue through the use of a DCAM. The DCAM can contain the address of the A-type issue queue entry and an address of a temporary register. Further, the A-type instruction queue entry can be paired with a B-type issue queue entry, thus the B-type issue queue entry holds the associated A-type issue queue entry ID. When a mixed source dependency is detected, such as a vector (A-type) instruction which depends on an integer (B-type) instruction, whether from two separate instructions or as a result of dividing a single architectural instruction into two separate instructions, the A-type instruction can be dispatched into the A-type issue queue entry that was associated with the DCAM. The B-type instruction can then be dispatched into a B-type issue queue entry that was paired with the A-type issue queue entry. The B-type instruction can execute while the A-type instruction stalls, waiting for the dependency on the B-type instruction to resolve. When the B-type instruction completes execution, the B-type instruction broadcasts the A-type issue queue entry ID since they were previously paired. This A-type issue queue ID saves the result of the B-type instruction to the temporary register associated with the A-type issue queue. The physical output register ID of the B-type instruction can be broadcast on the completion bus and can be used to clear a dependency in the A-type instruction that was stalled in the A-type issue queue. The A-type instruction can obtain the results from the temporary register by looking up, in the DCAM, the temporary register ID associated with the A-type issue queue entry.

In a further implementation example, the B-type issue queue entry can include the entry ID of the A-type issue queue. The B-type issue queue can also be associated with a temporary register address. Again, the B-type instruction can execute while the A-type instruction stalls, waiting for the dependency on the B-type instruction to resolve. When the B-type instruction completes execution, results of the B-type instruction can be written to the temporary register address that was associated with the B-type issue queue entry. The temporary address can be forwarded to the A-type issue queue and the dependency flag can be cleared. The A-type instruction can then execute, using the temporary register to access results from the B-type instruction that completed. In this implementation, the disclosed DCAM structures are not required.

Figure 6:
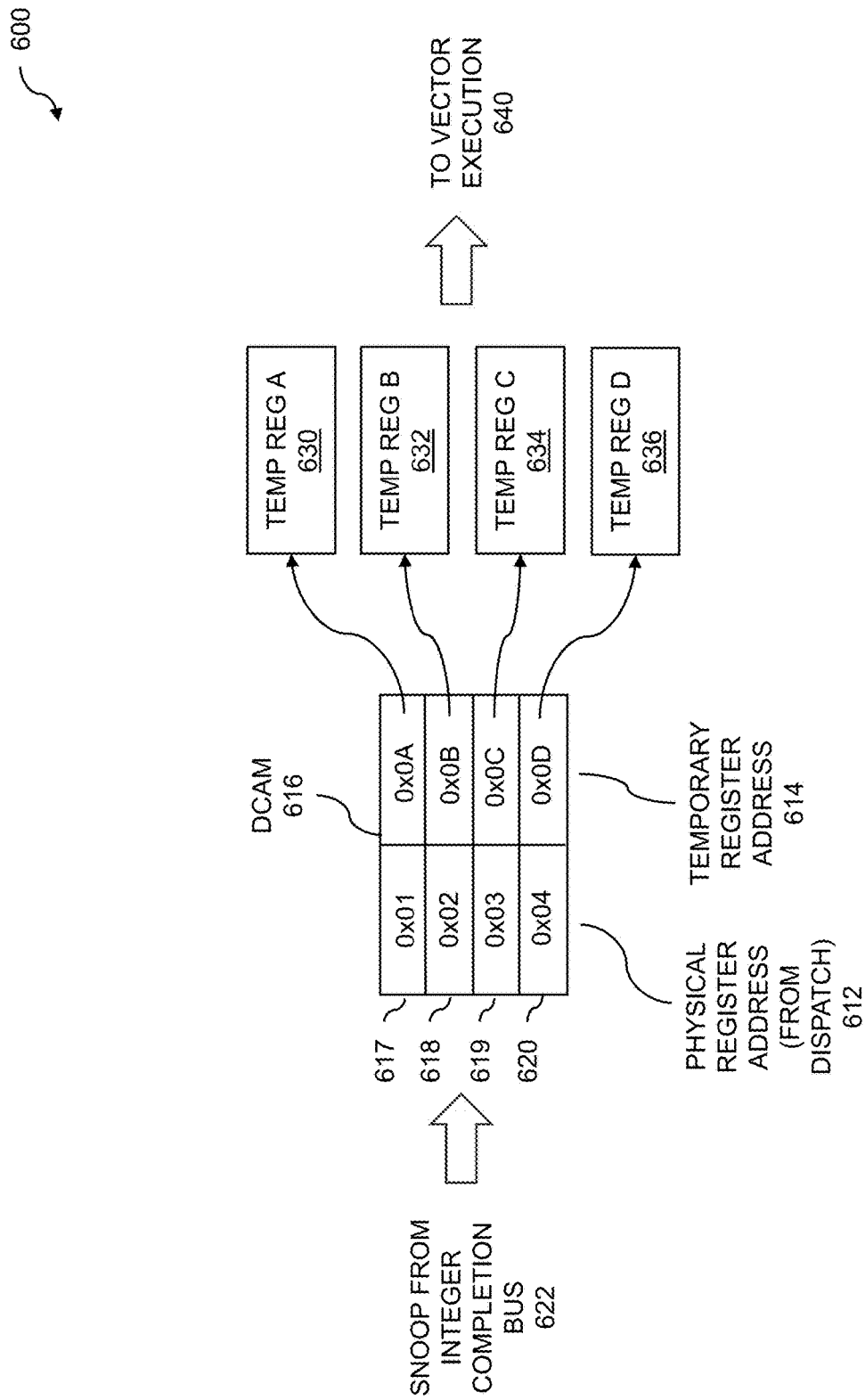
FIG. 6 is a block diagram showing vector dependency content addressable memory (DCAM) details.

FIG. 6 is a block diagram showing vector dependency content addressable memory (DCAM) details. In the block diagram 600, a DCAM module 616 comprises four separate DCAMs as indicated by 617, 618, 619, and 620. Each DCAM is associated with a temporary register via a temporary register address 614. As shown in the figure, DCAM 617 is associated with temporary register A 630 via temporary register address 0x0A, DCAM 618 is associated with temporary register B 632 via temporary register address 0x0B, DCAM 619 is associated with temporary register C 634 via temporary register address 0x0C, and DCAM 620 is associated with temporary register D 636 via temporary register address 0x0D. A physical register address from dispatch 612 can be provided to the DCAMs when an A-type instruction (which can be a vector instruction) is dependent on a B-type instruction (which can be an integer or floating-point instruction). The physical register address for the B-type instruction can be written into the DCAM of the corresponding issue queue entry of the A-type instruction. Thus, in block diagram 600, physical register address 0x01 is loaded into DCAM 617, physical register address 0x02 is loaded into DCAM 618, physical register address 0x03 is loaded into DCAM 619 and physical register address 0x04 is loaded into DCAM 620.

Once complete, an integer completion bus can broadcast the result and physical register address of the B-type instruction. In embodiments, a floating-point completion bus broadcasts the result and physical register address. A snoop of the completion bus 622 can be used to look up, in the DCAMs, the physical register address broadcasted on the completion bus. If a hit is detected in one of the DCAMs, the result on the integer completion bus can be written to the temporary register stored in the DCAM that was hit. The temporary register can then be used to read operands needed by the A-type instruction during execution. Once the prerequisite data from a dependent B-type instruction is available in the corresponding temporary register, the dependency flags for the corresponding A-type instruction are cleared, enabling the A-type instruction to execute, retrieving required operand data from the corresponding temporary register. The values in the temporary registers 630, 632, 634, and/or 636 can be provided as input to vector execution 640. Accordingly, disclosed embodiments enable mixed-source dependency control without reliance on general-purpose registers, thereby reducing hardware element requirements while still providing efficient instruction execution.

Figure 7:
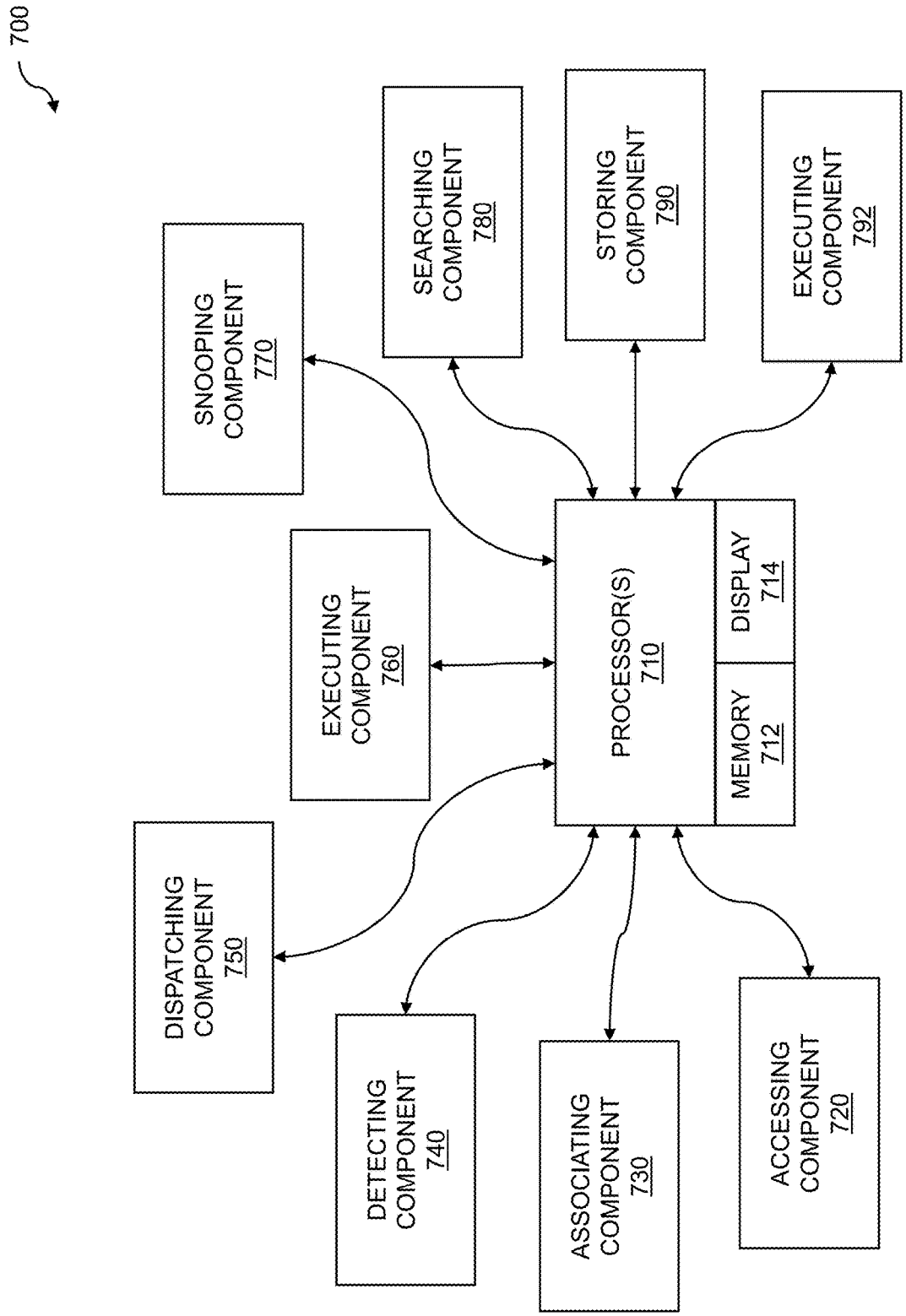
FIG. 7 is a system diagram for mixed-source dependency control for vector instructions.

FIG. 7 is a system diagram for mixed-source dependency control for vector instructions. The system 700 can include instructions and/or functions for design and implementation of integrated circuits that support direct cache transfer with shared cache lines. The system 700 can include instructions and/or functions for generation and/or manipulation of design data such as hardware description language (HDL) constructs for specifying structure and operation of an integrated circuit. The system 700 can further perform operations to generate and manipulate Register Level Transfer (RTL) abstractions. These abstractions can include parameterized inputs that enable the specifying of design elements such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices.

The system can include one or more of processors, memories, cache memories, displays, and so on. The system 700 can include one or more processors 710. The processors can include standalone processors within integrated circuits or chips, processor cores in FPGAs or ASICs, and so on. The one or more processors 710 are coupled to a memory 712, which stores operations. The memory can include one or more of local memory, cache memory, system memory, etc. The system 700 can further include a display 714 coupled to the one or more processors 710. The display 714 can be used for displaying data, instructions, operations, and the like. The operations can include instructions and functions for implementation of integrated circuits, including processor cores. In embodiments, the processor cores can include RISC-V™ processor cores.

The system 700 can include an accessing component 720. The accessing component 720 can include functions and instructions for accessing a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAM). The processor core can include a RISC-V core, ARM core, MIPS core, and/or other suitable core type.

The system 700 can include an associating component 730. The associating component 730 can include functions and instructions for associating a DCAM within the one or more DCAMs with an entry of the A-type issue queue, wherein the associating includes a unique temporary register. In embodiments, the A-type issue queue includes multiple slots for accommodating vector instructions, and a corresponding DCAM is associated with each slot of the multiple slots.

The system 700 can include a detecting component 740. The detecting component 740 can include functions and instructions for detecting a dependency within an A-type instruction, wherein the dependency is based on an output of a B-type instruction, and wherein the detecting identifies a physical output register ID associated with the B-type instruction. In one or more embodiments, the detecting component can perform register renaming to provide additional architectural registers that help resolve name dependencies and avoid WAW (write-after-write) and WAR (write-after-read) hazards. In embodiments, this can include mapping architectural registers (e.g., visible to the programmer) to physical registers (e.g., used internally by the processor). One or more embodiments may employ a reorder buffer or reservation station to track the execution status of instructions. This enables the processor to reorder instructions for out-of-order execution while confirming that the results are written to architectural registers in the correct order.

The system 700 can include a dispatching component 750. The dispatching component 750 can include functions and instructions for dispatching the A-type instruction and the B-type instruction, wherein the A-type instruction is sent to the A-type issue queue and the B-type instruction is sent to the B-type issue queue, wherein the dispatching includes the physical output register ID. The system 700 can include an executing component 760. The executing component 760 can include functions and instructions for by the processor core, the B-type instruction. In one or more embodiments, the B-type instruction can include an integer instruction or floating-point instruction.

The system 700 can include a snooping component 770. The snooping component 770 can include functions and instructions for snooping a completion bus associated with the B-type issue queue, wherein the snooping is based on the physical output register ID. In one or more embodiments, the B-type issue queue can include an integer issue queue or a floating-point issue queue. The system 700 can include a searching component 780. The searching component 780 can include functions and instructions for searching, for a match in the DCAM, wherein the searching is based on the physical output register ID that was snooped, wherein the searching causes a hit in the DCAM, and wherein the DCAM returns the unique temporary register that was associated with the DCAM. The system 700 can include a storing component 790. The storing component 790 can include functions and instructions for storing, in the unique temporary register that was returned, the output of the B-type instruction, from the completion bus, wherein the storing clears a dependency flag in the A-type issue queue, wherein the clearing indicates that the dependency has been satisfied. The system 700 can include an executing component 792. The executing component 790 can include functions and instructions for executing the A-type instruction, wherein the dependency is satisfied with data within the unique temporary register that was returned. In one or more embodiments, the A-type instruction comprises a vector instruction.

The system 700 can include a computer program product embodied in a non-transitory computer readable medium for instruction execution, the computer program product comprising code which causes one or more processors to generate semiconductor logic for: accessing a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs); associating a DCAM within the one or more DCAMs with an entry of the A-type issue queue, wherein the associating includes a unique temporary register; detecting a dependency within an A-type instruction, wherein the dependency is based on an output of a B-type instruction, and wherein the detecting identifies a physical output register ID associated with the B-type instruction; dispatching the A-type instruction and the B-type instruction, wherein the A-type instruction is sent to the A-type issue queue and the B-type instruction is sent to the B-type issue queue, wherein the dispatching includes the physical output register ID; executing, by the processor core, the B-type instruction; snooping a completion bus associated with the B-type issue queue, wherein the snooping is based on the physical output register ID; searching, for a match in the DCAM, wherein the searching is based on the physical output register ID that was snooped, wherein the searching causes a hit in the DCAM, and wherein the DCAM returns the unique temporary register that was associated with the DCAM; storing, in the unique temporary register that was returned, the output of the B-type instruction, from the completion bus, wherein the storing clears a dependency flag in the A-type issue queue, wherein the clearing indicates that the dependency has been satisfied; and executing the A-type instruction, wherein the dependency is satisfied with data within the unique temporary register that was returned.

The system 700 can include a computer system for instruction execution comprising: a memory which stores instructions; one or more processors coupled to the memory wherein the one or more processors, when executing the instructions which are stored, are configured to: access a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs); associate a DCAM within the one or more DCAMs with an entry of the A-type issue queue, wherein the associating includes a unique temporary register; detect a dependency within an A-type instruction, wherein the dependency is based on an output of a B-type instruction, and wherein the detecting identifies a physical output register ID associated with the B-type instruction; dispatch the A-type instruction and the B-type instruction, wherein the A-type instruction is sent to the A-type issue queue and the B-type instruction is sent to the B-type issue queue, wherein the dispatching includes the physical output register ID; execute, by the processor core, the B-type instruction; snoop a completion bus associated with the B-type issue queue, wherein the snooping is based on the physical output register ID; search, for a match in the DCAM, wherein the searching is based on the physical output register ID that was snooped, wherein the searching causes a hit in the DCAM, and wherein the DCAM returns the unique temporary register that was associated with the DCAM; store, in the unique temporary register that was returned, the output of the B-type instruction, from the completion bus, wherein the storing clears a dependency flag in the A-type issue queue, wherein the clearing indicates that the dependency has been satisfied; and execute the A-type instruction, wherein the dependency is satisfied with data within the unique temporary register that was returned.

As can now be appreciated, disclosed embodiments can accommodate instructions that have a dependency on an integer or floating-point instruction. Disclosed embodiments utilize a CAM associated with each vector issue queue entry to indicate the address of a temporary register where the depending instruction's result is stored. Thus, disclosed embodiments eliminate the need to add a separate read port on the general-purpose register file, thereby alleviating timing and/or area issues, thereby saving cost and complexity, while enabling vector instruction execution performance.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions-generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for instruction execution comprising:

accessing a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs);

associating a DCAM within the one or more DCAMs with an entry of the A-type issue queue, wherein the associating includes a unique temporary register;

detecting a dependency within an A-type instruction, wherein the dependency is based on an output of a B-type instruction, and wherein the detecting identifies a physical output register ID associated with the B-type instruction;

dispatching the A-type instruction and the B-type instruction, wherein the A-type instruction is sent to the A-type issue queue and the B-type instruction is sent to the B-type issue queue, wherein the dispatching includes the physical output register ID;

executing, by the processor core, the B-type instruction;

snooping a completion bus associated with the B-type issue queue, wherein the snooping is based on the physical output register ID;

searching, for a match in the DCAM, wherein the searching is based on the physical output register ID that was snooped, wherein the searching causes a hit in the DCAM, and wherein the DCAM returns the unique temporary register that was associated with the DCAM;

storing, in the unique temporary register that was returned, the output of the B-type instruction, from the completion bus, wherein the storing clears a dependency flag in the A-type issue queue, wherein the clearing indicates that the dependency has been satisfied; and executing the A-type instruction, wherein the dependency is satisfied with data within the unique temporary register that was returned.

2. The method of claim 1 further comprising identifying, within the A-type instruction, a second dependency.

3. The method of claim 2 wherein the second dependency is based on an output of a second A-type instruction.

4. The method of claim 3 wherein the dispatching and the executing includes the second A-type instruction.

5. The method of claim 4 further comprising saving the output of the second A-type instruction in a register within a register file.

6. The method of claim 5 further comprising updating the entry of the A-type issue queue, corresponding to the A-type instruction, with the register.

7. The method of claim 5 further comprising forwarding, by bypass logic, the output of the second A-type instruction to the entry of the A-type issue queue.

8. The method of claim 7 further comprising clearing a second dependency flag, in the entry of the A-type issue queue, wherein the second dependency flag indicates that the second dependency has been satisfied.

9. The method of claim 2 wherein the A-type instruction comprises a vector instruction.

10. The method of claim 9 wherein the A-type issue queue comprises a vector issue queue.

11. The method of claim 10 wherein the B-type instruction comprises an integer instruction.

12. The method of claim 11 wherein the B-type issue queue comprises an integer issue queue.

13. The method of claim 10 wherein the B-type instruction comprises a floating-point instruction.

14. The method of claim 13 wherein the B-type issue queue comprises a floating-point issue queue.

15. The method of claim 1 further comprising dividing an architectural instruction into the A-type instruction and the B-type instruction.

16. The method of claim 15 wherein the physical output register ID associated with the B-type instruction is a register that is read by the B-type instruction.

17. The method of claim 1 wherein the DCAM is included within a vector execution unit.

18. The method of claim 1 wherein the associating comprises linking a second DCAM within the one or more DCAMs with a second entry of the A-type issue queue, wherein the associating includes a second unique temporary register.

19. The method of claim 1 wherein a number of DCAMs is equivalent to a number of entries in the A-type issue queue.

20. The method of claim 1 wherein the processor core executes one or more instructions out of order.

21. The method of claim 1 wherein the A-type instruction includes a first instruction type.

22. The method of claim 1 wherein the B-type instruction includes a second instruction type.

23. A computer program product embodied in a non-transitory computer readable medium for instruction execution, the computer program product comprising code which causes one or more processors to generate semiconductor logic for:
   accessing a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs);
   associating a DCAM within the one or more DCAMs with an entry of the A-type issue queue, wherein the associating includes a unique temporary register;
   detecting a dependency within an A-type instruction, wherein the dependency is based on an output of a B-type instruction, and wherein the detecting identifies a physical output register ID associated with the B-type instruction;
   dispatching the A-type instruction and the B-type instruction, wherein the A-type instruction is sent to the A-type issue queue and the B-type instruction is sent to the B-type issue queue, wherein the dispatching includes the physical output register ID;
   executing, by the processor core, the B-type instruction;
   snooping a completion bus associated with the B-type issue queue, wherein the snooping is based on the physical output register ID;
   searching, for a match in the DCAM, wherein the searching is based on the physical output register ID that was snooped, wherein the searching causes a hit in the DCAM, and wherein the DCAM returns the unique temporary register that was associated with the DCAM;
   storing, in the unique temporary register that was returned, the output of the B-type instruction, from the completion bus, wherein the storing clears a dependency flag in the A-type issue queue, wherein the clearing indicates that the dependency has been satisfied; and
   executing the A-type instruction, wherein the dependency is satisfied with data within the unique temporary register that was returned.

24. A computer system for instruction execution comprising:
   a memory which stores instructions;
   one or more processors coupled to the memory wherein the one or more processors, when executing the instructions which are stored, are configured to:
      access a processor core, wherein the processor core executes instructions from a plurality of categories, wherein the plurality of categories include A-type instructions and B-type instructions, wherein the processor core includes one or more A-type issue queues which are associated with A-type instructions, wherein the processor core includes one or more B-type issue queues which are associated with one or more B-type instructions, wherein an A-type issue queue within the one or more A-type issue queues is communicatively coupled with a B-type issue queue within the one or more B-type issue queues, and wherein the processor core includes one or more dependency content addressable memories (DCAMs);
      associate a DCAM within the one or more DCAMs with an entry of the A-type issue queue, wherein the associating includes a unique temporary register;
      detect a dependency within an A-type instruction, wherein the dependency is based on an output of a B-type instruction, and wherein the detecting identifies a physical output register ID associated with the B-type instruction;
      dispatch the A-type instruction and the B-type instruction, wherein the A-type instruction is sent to the A-type issue queue and the B-type instruction is sent to the B-type issue queue, wherein the dispatching includes the physical output register ID;
      execute, by the processor core, the B-type instruction;
      snoop a completion bus associated with the B-type issue queue, wherein the snooping is based on the physical output register ID;
      search, for a match in the DCAM, wherein the searching is based on the physical output register ID that was snooped, wherein the searching causes a hit in the DCAM, and wherein the DCAM returns the unique temporary register that was associated with the DCAM;
      store, in the unique temporary register that was returned, the output of the B-type instruction, from the completion bus, wherein the storing clears a dependency flag in the A-type issue queue, wherein the clearing indicates that the dependency has been satisfied; and execute the A-type instruction, wherein the dependency is satisfied with data within the unique temporary register that was returned.

* * * * *